No. 891,507.  
PATENTED JUNE 23, 1908.

F. STREICH.  
DOUGH DIVIDER.  
APPLICATION FILED JULY 21, 1905.

2 SHEETS—SHEET 1.

Witnesses:  
John Braunwalder  
R. B. MacIntosh

Inventor:  
Frank Streich  
By Frederick Benjamin  
Att'y

No. 891,507. PATENTED JUNE 23, 1908.
F. STREICH.
DOUGH DIVIDER.
APPLICATION FILED JULY 21, 1905.

2 SHEETS—SHEET 2.

Witnesses:
John Braunwalder
R. B. MacIntosh

Inventor:
Frank Streich
By Frederick Benjamin
Att'y.

UNITED STATES PATENT OFFICE.

FRANK STREICH, OF CHICAGO, ILLINOIS, ASSIGNOR, BY MESNE ASSIGNMENTS, TO CHAMPION MACHINERY COMPANY, OF JOLIET, ILLINOIS, A CORPORATION OF ILLINOIS.

DOUGH-DIVIDER.

No. 891,507.   Specification of Letters Patent.   Patented June 23, 1908.

Application filed July 21, 1905. Serial No. 270,733.

To all whom it may concern:

Be it known that I, FRANK STREICH, citizen of the United States, residing at Chicago, in the county of Cook and State of Illinois, have invented certain new and useful Improvements in Dough-Dividers, of which the following is a specification.

This invention relates to machines for dividing masses of bread dough into lumps of uniform size, density and weight.

The especial object of the improvements hereinafter set forth is to produce a machine of this character of comparatively cheap construction and simple operation; which will divide a mass of dough quickly and deliver same in lumps to an endless carrier; in which the lumps will be scaled accurately; in which lumps of various predetermined size may be produced by a simple adjustment of the parts; in which the compression and division of the mass of dough will be performed in a manner that will not "kill" or express the gases which constitute the "life" of the dough, and in which there will be a minimum contact between the mechanical parts and the dough.

Figure 1:
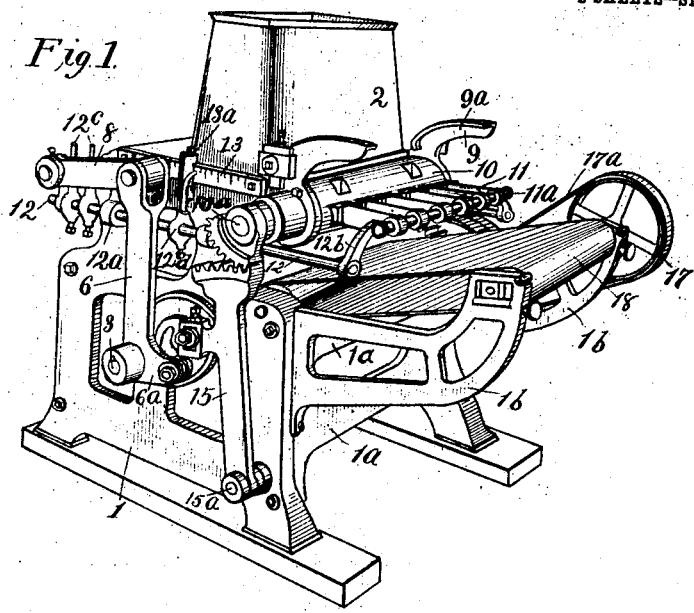
Figure 2:
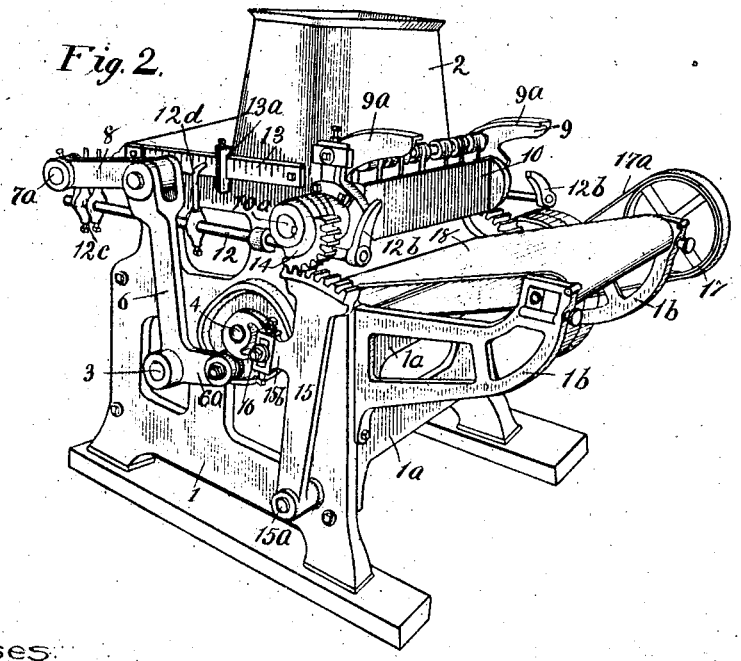
Figure 3:
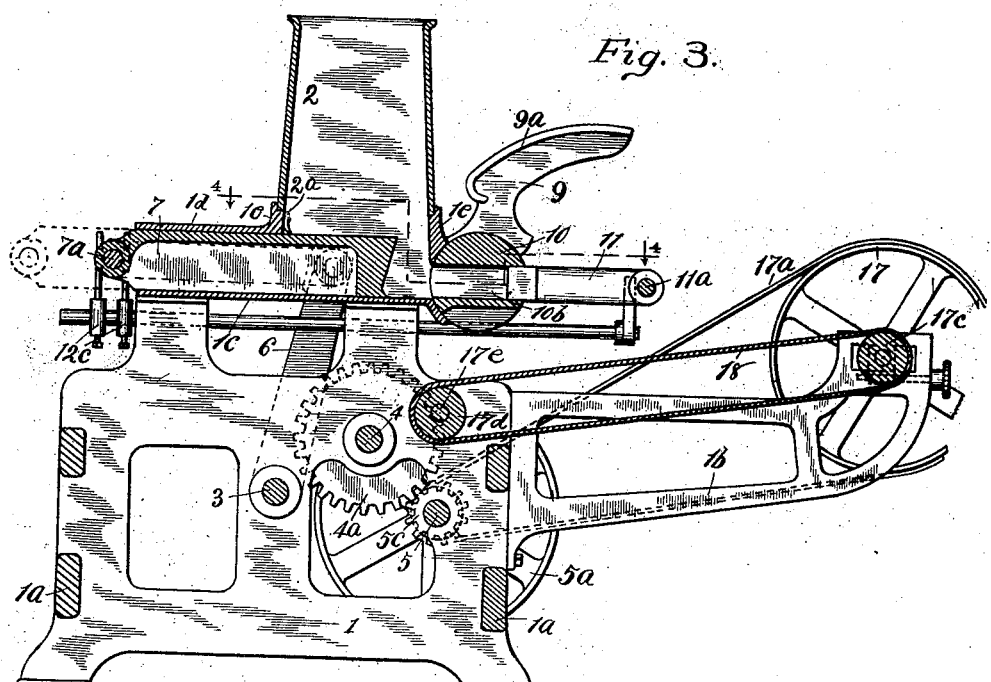
Figure 4:
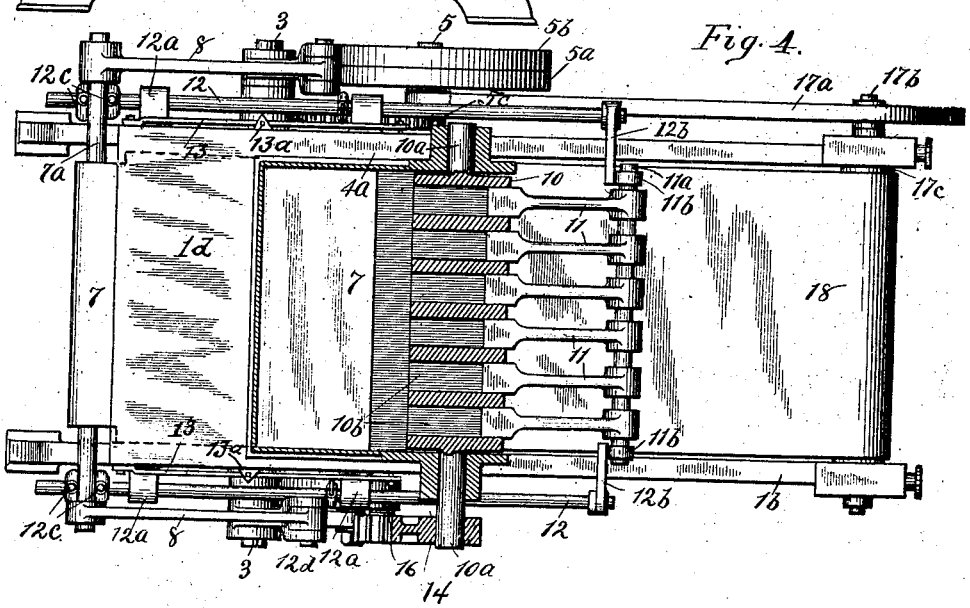

In the accompanying drawings which form a part of this application: Figure 1 is a perspective view of my improved dough divider showing the parts in one position; Fig. 2 is a perspective view of the machine showing certain parts in a position reverse to that shown in Fig. 1; Fig. 3 is a longitudinal vertical section through the machine, and Fig. 4 is a cross section substantially on the lines 4—4 of Fig. 3.

Referring to the details of the drawings, 1, 1ª, represent the side and cross pieces respectively of the main frame of my machine the same being suitably secured together to provide a rigid and substantial support for the operative parts.

1ᵇ, 1ᵇ, represent brackets which extend forwardly and upwardly from the main frame of the machine and serve as supports for the parts to be described.

2 represents a suitable hopper of cast iron secured in any approved manner to the upper part or bed of the machine, the lower open end of said hopper extending over the bed 1ᶜ of the machine. A stud shaft 3 is secured in each side of the frame of the machine and extends outwardly therefrom. Extending transversely of the frame is a main drive shaft 4.

5 represents a stud shaft extending from one side only of the machine.

Mounted on each of the stud-shafts 3 are levers 6 one of which has two arms and on the outer end of the shorter arm 6ª of which, is mounted a roller which is arranged in a groove in the face of a cam 16 mounted on the shaft 4.

7 represents a hollow piston which is mounted in a suitable slideway formed between the bed plate 1ᶜ and a parallel plate 1ᵈ. The forward or inner end of the piston is formed at an acute angle as shown in Fig. 3, and the outer or rear end is mounted on the shaft 7ª which extends transversely of the machine and at the rear of same, and has pivoted thereon arms 8 the other ends of which are pivotally connected with the upper end of the longer arm of the levers 6.

1ᵉ represents a thickened portion of the upper part of the frame at the base of the hopper 2, and extending therefrom upwardly and forwardly, are brackets 9 the upper edges of which are formed with overhanging curved flanges 9ª.

10 represents a cylinder provided with trunnions 10ª which are journaled in the thickened portion of the frame of my machine as shown in Fig. 4. The cylinder is formed with a plurality of compartments or chambers 10ᵇ which are separated from each other by parallel partitions 10ᶜ, as clearly shown in Figs. 3 and 4.

11 represents a plurality of reciprocating plungers the heads of which are adapted to slide snugly in the chambers 10ᵇ. These plungers are pivoted at their outer ends on the shaft 11ª on the ends of which are rollers 11ª.

12, 12, represent shafts rockably and slidably journaled in the bosses 12ª formed on the outer face of the main frame members as shown in Fig. 4. Extending upwardly and inwardly from the forward ends of the shafts 12 are curved fingers 12ᵇ. Adjustably mounted on the rear portion of the shafts 12 are upwardly extending pins 12ᶜ.

12ᵈ represents a dog which is adjustably secured on each of the shafts 12 and has its upper end extending upwardly so as to engage the guide 13ª which is adjustably mounted on the gage bar 13, the latter being secured to the frame of the machine at the base of the hopper and having on its outer face a suitable scale.

14 represents a segmental gear which is keyed on one end of the shaft 10ᵃ and is so arranged as to have its teeth mesh with similar teeth formed on the upper end of the lever 15 which is rockably mounted on the stud shaft 15ᵃ. The lever 15 is formed with an extension 15ᵇ on its rear edge in which is adjustably mounted a roller of the usual form which is arranged to lie in the groove of the cam 16.

17 represents a drive pulley secured on one end of the shaft 17ᵇ which is adjustably journaled in suitable boxes arranged in the outer ends of the brackets 1ᵇ. The pulley 17 carries a belt 17ᵃ which runs to a small wheel or pulley mounted on the shaft 5. Secured on the shaft 17ᵇ is a roller 17ᶜ which carries an endless apron 18 which also runs over a similar roller 17ᵈ mounted on the shaft 17ᵉ, journaled in the frame as shown in Fig. 3.

Power is communicated to the machine from any suitable source by the tight and loose pulleys 5ᵃ, 5ᵇ, mounted on the shaft 5.

5ᶜ represents a small pinion mounted on the shaft 5 within the frame of the machine and the teeth of said pinion mesh with the gear 4ᵃ fixed on the shaft 4.

A machine constructed substantially as described will operate as follows:—Power being applied to the pulley 5ᵃ, the shaft 5 will be driven and with it the pinion 5ᶜ which in turn will drive the gear 4ᵃ and the shaft 4 on which the cam 16 is mounted. Upon the rotation of the cam 16, motion will be given to the levers 6 and 15 through the contact of the rollers mounted on said levers with the grooved face of the cam as will be readily understood, thus reciprocating said levers. The levers 6 through their respective connecting bars 8 will reciprocate the shaft 7ᵃ and thus cause a corresponding reciprocating movement to the shafts 12. The lever 15 through its gear connection with the segment 14 will rock the shaft 10ᵃ and with said shaft, the chambered cylinder 10. Upon the forward movement of the shaft 12 the fingers 12ᵇ will engage the rollers 11ᵇ which are mounted near the ends of the shaft 11ᵃ and thus push forwardly said shaft and with it the plungers 11. When the plungers have been moved forwardly the desired distance the dogs 12ᵈ will ride over the gages 13ᵃ and thus cause the shafts 12 to rock in their bearings and thereby throw fingers 12ᵇ outwardly and disengage them from the rollers 11ᵇ thus limiting the forward or outward movement of the plungers 11. At the same time that the plungers are being moved outwardly as shown, the piston 7 will move forwardly through the operation of the shaft 7ᵃ rods 8 and levers 6 and a portion of the dough in the hopper 2 will be forced forwardly into the chambers 10ᵇ and at the same time the piston will cut off the main portion of the dough in the upper portion of the hopper. After the plungers have reached the limit of their outward movement the lever 15 will act on the segment 14 to rock the shaft 10ᵃ and thus partially rotate the cylinder 10 so as to bring the plungers in a vertical position as shown in Fig. 2. The weight of these plungers, coupled with the positive co-action of the flange 9ᵃ on the rollers 11ᵇ will force the plungers downwardly and thus expel the lumps of dough in each of the chambers 10ᵇ, said lumps dropping upon the apron 18 which is driven by the pulley 17 and shaft 17ᶜ.

By so gearing the parts that the plungers will move slightly in advance of the piston 7 it has been found that the suction created by the plungers and due to the partial vacuum in the chambers will readily draw the dough into the chambers thus aiding the operation of the piston 7 in feeding the dough into such chambers and permitting the expansion of the dough gases. The peculiar shape of the piston permits more dough to be fed downwardly to the mouth of each chamber than is required to fill same but the rotation of the cylinder will serve to cut off the excess dough which will be drawn into the chambers on the next operation.

It will be apparent that the position of the gages 13ᵃ on the bars 13, regulates the throw of the plungers it being understood that the outward movement of said plungers is effected solely by the fingers 12ᵇ, so that, by adjusting the position of the gages 13ᵃ on said bars the plungers may be controlled so as to draw in to the chambers more or less dough as may be required to produce lumps of predetermined weight.

The construction and arrangement of the plungers renders easy their withdrawal for cleaning and thus affords access to the chambers. By removing the pins 12ᶜ, the shaft 7ᵃ and the piston 7 can also be readily removed.

Having thus described my invention what I claim as new and desire to secure by Letters Patent, is:—

1. In a dough divider, a hopper, a dough-receiving chamber communicating with said hopper, a reciprocating piston arranged in said chamber, an oscillating cylinder having dough measuring chambers extending transversely therethrough, means for reciprocating said piston, means for oscillating said cylinder, plungers slidably and removably mounted in said measuring chambers, and means connected with said piston for moving said plungers outwardly.

2. In a dough divider, a hopper, a dough receiving chamber communicating with said hopper, a reciprocating piston arranged in said chamber, an oscillating cylinder having dough measuring chambers extending therethrough, means for reciprocating said piston, means for oscillating said cylinder, plungers slidably and removably mounted in said dough measuring chambers, adjustable means connected with said piston for moving said plungers outwardly, and means for moving said plungers inwardly.

3. In a dough divider, a hopper, a dough receiving chamber communicating with said hopper, a reciprocating piston mounted in said chamber, an oscillating cylinder having end trunnions mounted in the frame of said machine, said cylinder divided in a plurality of dough receiving chambers extending transversely therethrough, a plurality of plungers arranged on a common shaft and removably and slidably mounted in said dough receiving chambers, and adjustable means for moving said plungers outwardly, said means operable by said piston.

4. In a dough divider including a suitable supporting frame, a hopper arranged on said frame, a dough receiving chamber communicating with said hopper, a reciprocating piston mounted in said chamber, an oscillating chambered member, means for reciprocating said piston, means for oscillating said chambered member, plungers slidably mounted in the chambered member, adjustable means for moving said plungers outwardly, said means connected with and operated by said piston, and means for moving said plungers inwardly said means connected with said frame.

In testimony whereof I affix my signature in presence of two witnesses.

FRANK STREICH.

Witnesses:
  H. DE LOS HIGMAN,
  F. BENJAMIN.